US011231710B2

(12) United States Patent
Tanaka et al.

(10) Patent No.: US 11,231,710 B2
(45) Date of Patent: Jan. 25, 2022

(54) AUTOMATIC DRIVING SYSTEM

(71) Applicant: TOYOTA JIDOSHA KABUSHIKI KAISHA, Toyota (JP)

(72) Inventors: Takaaki Tanaka, Susono (JP); Kenichiro Aoki, Miyoshi (JP); Masayuki Katoh, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 106 days.

(21) Appl. No.: 16/653,027

(22) Filed: Oct. 15, 2019

(65) Prior Publication Data

US 2020/0201321 A1 Jun. 25, 2020

(30) Foreign Application Priority Data

Dec. 19, 2018 (JP) .............................. JP2018-237486

(51) Int. Cl.
*G05D 1/00* (2006.01)
*G05D 1/02* (2020.01)
*B60W 30/18* (2012.01)

(52) U.S. Cl.
CPC ......... *G05D 1/0061* (2013.01); *B60W 30/181* (2013.01); *G05D 1/0223* (2013.01); *B60W 2555/20* (2020.02); *B60W 2555/60* (2020.02); *B60W 2720/10* (2013.01); *G05D 2201/0213* (2013.01)

(58) Field of Classification Search
CPC ............... G05D 1/0061; G05D 1/0223; G05D 2201/0213; B60W 30/181; B60W 2555/20; B60W 2555/60; B60W 2720/10; B60W 2554/406; B60W 2552/53; B60W 60/0053

See application file for complete search history.

(56) References Cited

U.S. PATENT DOCUMENTS

| 9,932,038 B1* | 4/2018 | Zhu ..................... G05D 1/0088 |
| 2017/0066452 A1* | 3/2017 | Scofield ........... G08G 1/096725 |
| 2019/0039618 A1 | 2/2019 | Mori |
| 2019/0054928 A1 | 2/2019 | Hatano |

FOREIGN PATENT DOCUMENTS

| JP | 2017-159885 A | 9/2017 |
| JP | 2018-134971 A | 8/2018 |
| WO | 2017-141426 A1 | 8/2017 |

\* cited by examiner

*Primary Examiner* — Rodney A Butler
(74) *Attorney, Agent, or Firm* — Hunton Andrews Kurth LLP

(57) ABSTRACT

An automatic driving system includes a control device that controls automatic driving of a vehicle, and a storage device that contains external environment information indicating an external environment of the vehicle. A driving transition zone is a zone in which a driver of the vehicle takes over at least a part of driving of the vehicle, from the control device. A termination target velocity is a target velocity of the vehicle at an end point of the driving transition zone. The control device variably sets the termination target velocity, depending on the external environment at the end point or the external environment surrounding the end point. Then, the control device controls the velocity of the vehicle in the driving transition zone, such that the velocity of the vehicle at the end point is the termination target velocity.

9 Claims, 10 Drawing Sheets

| FIRST STANDPOINT | PRESCRIBED VELOCITY THAT IS PRESCRIBED FOR END POINT |
|---|---|
| SECOND STANDPOINT | ROAD ATTRIBUTE AT END POINT |
| THIRD STANDPOINT | PRESENCE OR ABSENCE OF CONGESTION IN FRONT OF END POINT |
| FOURTH STANDPOINT | WEATHER SURROUNDING END POINT |
| FIFTH STANDPOINT | ILLUMINANCE-DARKNESS SURROUNDING END POINT |

AUTOMATIC DRIVING SYSTEM

INCORPORATION BY REFERENCE

The disclosure of Japanese Patent Application No. 2018-237486 filed on Dec. 19, 2018 including the specification, drawings and abstract is incorporated herein by reference in its entirety.

BACKGROUND

1. Technical Field

The present disclosure relates to an automatic driving system that controls automatic driving of a vehicle.

2. Description of Related Art

International Publication No. WO 2017/141426 discloses a vehicle control device that controls automatic driving of a vehicle. The vehicle control device ends the automatic driving at a predetermined scheduled end point. When the position of the vehicle reaches a predetermined distance before the scheduled end point, the vehicle control device starts a deceleration control for decelerating the vehicle. A purpose of the deceleration control is to prompt a driver of the vehicle to transition to manual driving. The vehicle control device sets a transition completion point where the deceleration control is ended, to a point in front of the scheduled end point. Then, the vehicle control device performs the deceleration control, such that the vehicle stops at the transition completion point, that is, such that vehicle velocity becomes zero at the transition completion point.

Japanese Patent Application Publication No. 2017-159885 discloses a driving alternation control device. The alternation execution zone is a zone in which the driver starts to perform driving operations instead of an automatic driving function. For reducing a driving load on the driver in the alternation execution zone, the driving alternation control device changes a traveling control parameter in a switching zone in front of the alternation execution zone, such that the driving load decreases.

Japanese Patent Application Publication No. 2018-134971 discloses a vehicle control device that controls the automatic driving of the vehicle. The vehicle control device causes the driver to take over at least a part of the automatic driving and perform manual driving. In advance, the vehicle control device gives a taking-over demand to the driver. The vehicle control device sets the timing to give the taking-over demand, based on a driving difficulty level after the taking-over.

SUMMARY

An automatic driving system controls the automatic driving of the vehicle. Suppose that the automatic driving system ends at least a part of the automatic driving. The driver of the vehicle takes over at least a part of the driving of the vehicle, from the automatic driving system. On this occasion, the driver is likely to take over the driving while recognizing the external environment of the vehicle. Accordingly, if the vehicle velocity when the driver takes over the driving is set in the same way regardless of the external environment, there is concern that the driver has a strange feeling.

An object of the present disclosure is to provide a technology that makes it possible to reduce the strange feeling of the driver when the driver takes over at least a part of the driving of the vehicle from the automatic driving system.

An aspect of the present disclosure relates to an automatic driving system. The automatic driving system includes a control device that controls automatic driving of a vehicle, and a storage device that contains external environment information indicating an external environment of the vehicle. A driving transition zone is a zone in which a driver of the vehicle takes over at least a part of driving of the vehicle, from the control device. A termination target velocity is a target velocity of the vehicle at an end point of the driving transition zone. The control device variably sets the termination target velocity, depending on the external environment at the end point or the external environment surrounding the end point, and controls the velocity of the vehicle in the driving transition zone, such that the velocity of the vehicle at the end point is the termination target velocity.

The automatic driving system according to the present disclosure variably sets the termination target velocity at the end point, depending on the external environment at the end point of the driving transition zone or the external environment surrounding the end point. Then, the automatic driving system executes the velocity control such that the velocity of the vehicle at the end point is the set termination target velocity. This reduces the strange feeling of the driver when the driver takes over the driving of the vehicle from the automatic driving system.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

An embodiment of the present disclosure will be described with reference to the accompanying drawings.

1. Outline

Figure 1:
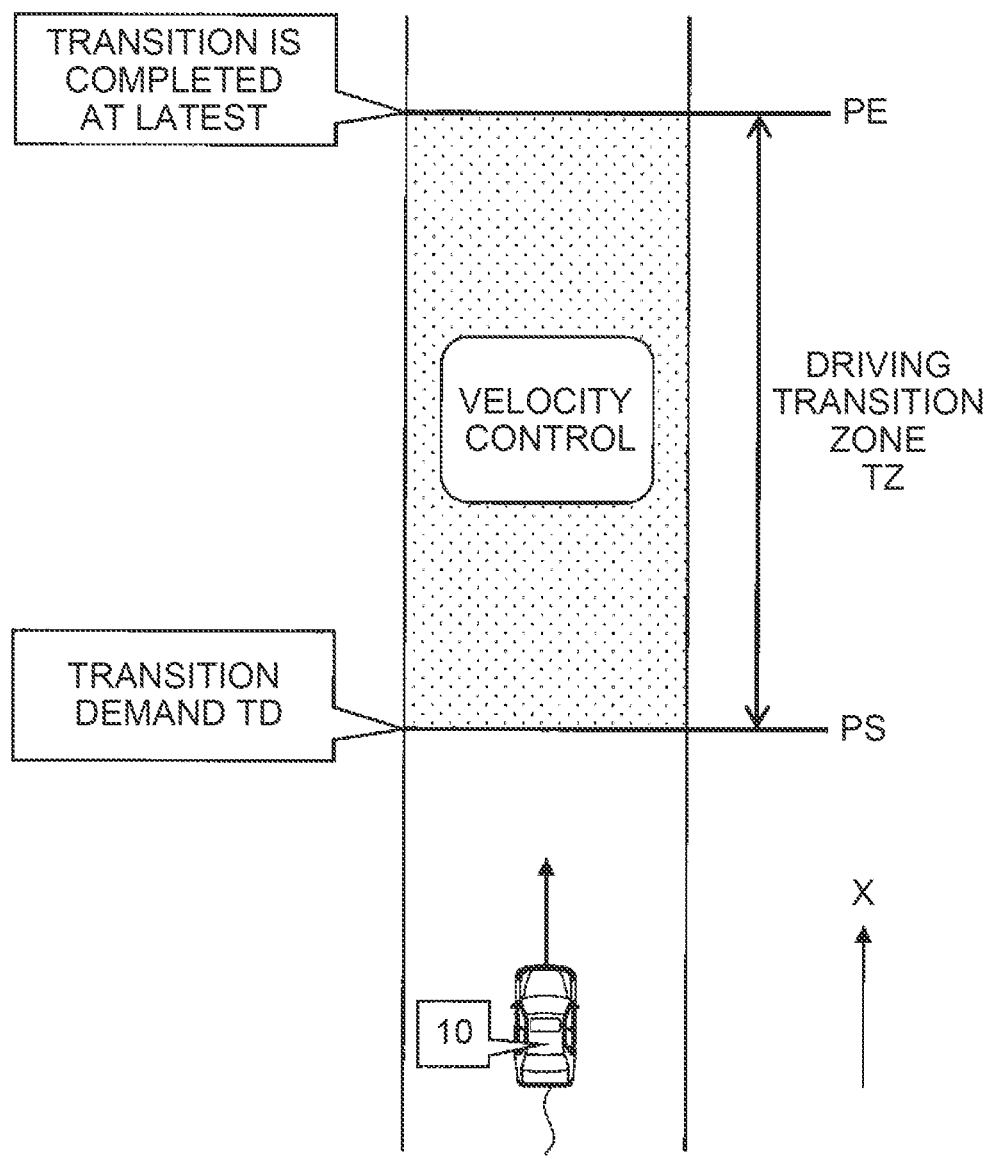
FIG. 1 is a conceptual diagram for describing an automatic driving system according to an embodiment of the present disclosure.

FIG. 1 is a conceptual diagram for describing an automatic driving system 10 according to an embodiment of the present disclosure. The automatic driving system 10 is mounted on a vehicle 1. The automatic driving system 10 controls automatic driving of the vehicle 1. The automatic driving of the vehicle 1 includes at least a part of acceleration, deceleration and steering of the vehicle 1.

Suppose that the automatic driving system 10 ends at least a part of the automatic driving of the vehicle 1. A driver of the vehicle 1 takes over at least a part of the driving (acceleration, deceleration and steering) of the vehicle 1, from the automatic driving system 10. The action in which the driver takes over at least a part of the driving of the vehicle 1 from the automatic driving system 10 is referred to as "driving transition", hereinafter. The driving transition can be also referred to as driving alternation or driving switch.

A driving transition zone TZ is a zone for the driving transition, and is defined as a zone from a start point PS to an end point PE. The end point PE is previously decided. For example, in the case where an automatic driving permission zone is previously decided, the end point PE is an end point of the automatic driving permission zone, or a point in front of the end point. The start point PS is in front of the end point PE. At the start point PS, the automatic driving system 10 issues a "transition demand TD" to the driver. In response to the transition demand TD, the driver takes over necessary driving from the automatic driving system 10. The driver needs to complete the driving transition before the end point PE at the latest.

In the driving transition zone TZ, the automatic driving system 10 executes a "velocity control" for appropriately controlling a vehicle velocity V (the velocity of the vehicle 1). Typically, the automatic driving system 10 performs a deceleration control for decelerating the vehicle velocity V. By the deceleration control, the driver can smoothly perform the driving transition without being impatient.

Figure 2:
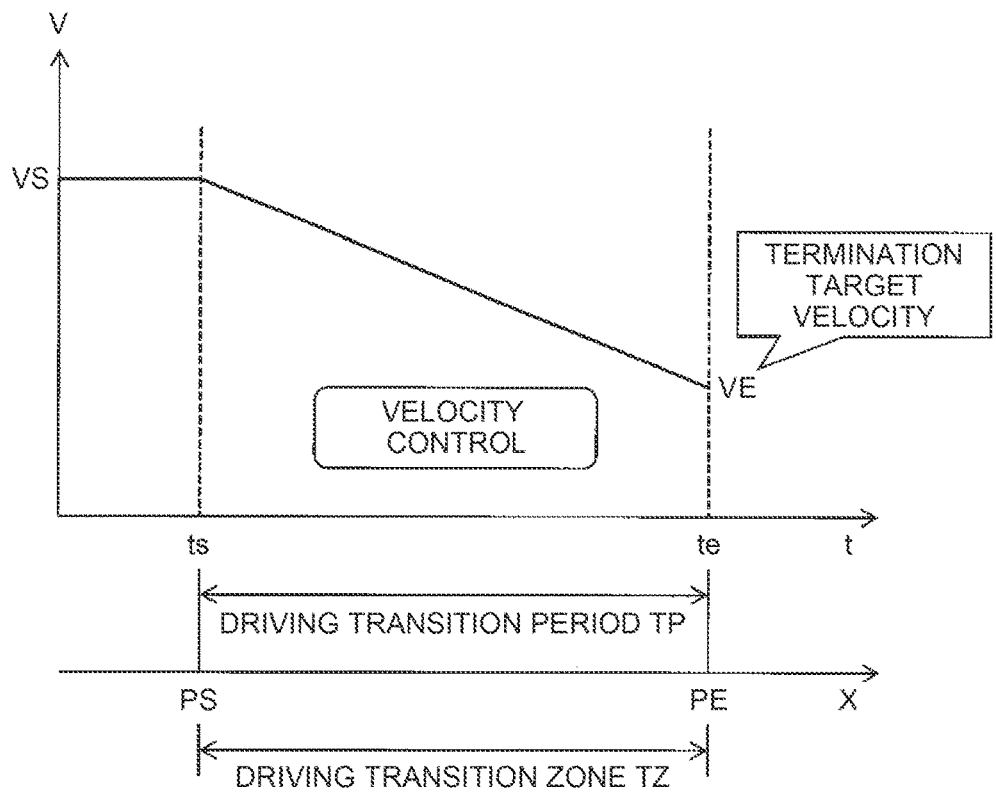
FIG. 2 is a conceptual diagram showing an exemplary velocity control in a driving transition process according to the embodiment of the present disclosure.

FIG. 2 is a conceptual diagram showing an exemplary velocity control. The ordinate axis indicates the vehicle velocity V. The abscissa axis indicates time or a movement direction X of the vehicle 1. A start timing ts is a timing corresponding to the start point PS of the driving transition zone TZ. The automatic driving system 10 issues the transition demand TD at the start timing ts. An end timing te is a timing corresponding to the end point PE of the driving transition zone TZ. The driving transition needs to be completed before the end timing te. The driving transition period TP is a period from the start timing ts to the end timing te. In the following description, the driving transition zone TZ and the driving transition period TP will be equivalently handled.

For the velocity control, first, the automatic driving system 10 sets a target velocity of the vehicle 1 at the end point PE. The target velocity of the vehicle 1 at the end point PE is referred to as a "termination target velocity VE", hereinafter. Then, the automatic driving system 10 controls the vehicle velocity V in the driving transition zone TZ, such that the vehicle velocity V at the end point PE is the set termination target velocity VE. When a start velocity VS at the start point PS is higher than the termination target velocity VE, the automatic driving system 10 decelerates the vehicle velocity V from the start velocity VS to the termination target velocity VE.

Figure 3:
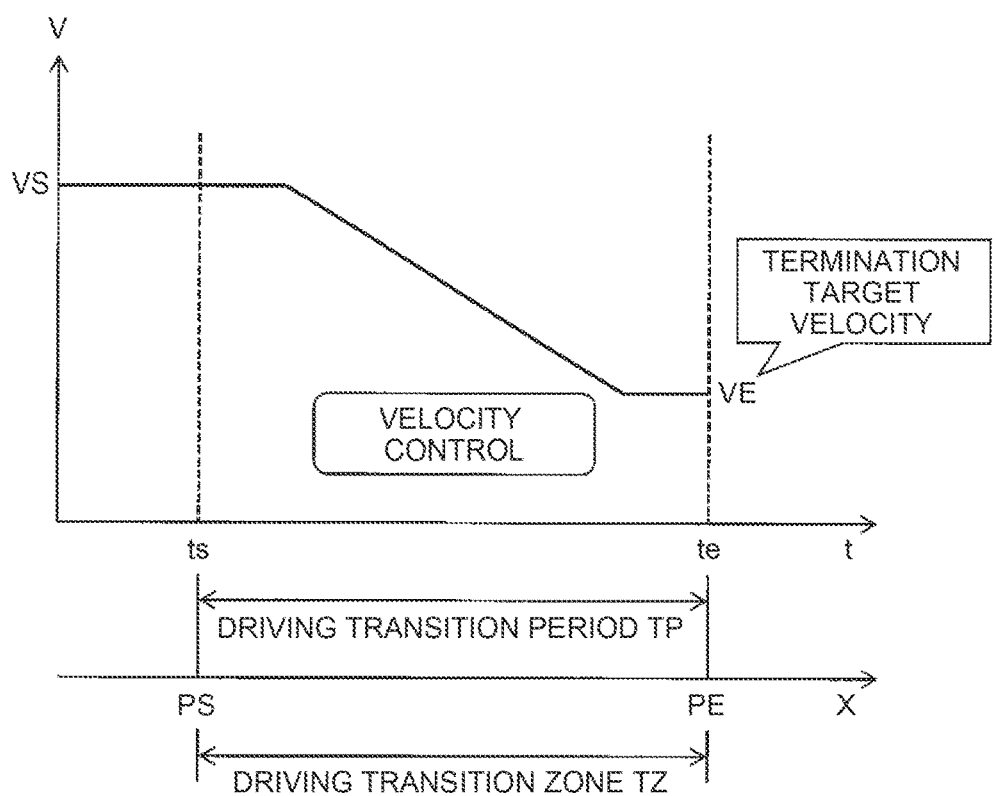
FIG. 3 is a conceptual diagram showing another exemplary velocity control in the driving transition process according to the embodiment of the present disclosure.

It is not necessary to monotonously change the vehicle velocity V in the driving transition zone TZ. For example, as shown in FIG. 3, the driving transition zone TZ may contain a zone where the vehicle velocity V is kept constant. The vehicle velocity V at the end point PE only needs to be the termination target velocity VE.

A process by the automatic driving system 10 that is relevant to the driving transition is referred to as a "driving transition process", hereinafter. For example, the driving transition process includes the setting of the termination target velocity VE, the decision of the start point PS, the issuance of the transition demand TD, the velocity control, and the like. With the embodiment, the automatic driving system 10 performs the driving transition process, so as to reduce a strange feeling of the driver at the time of the driving transition.

For example, in the driving transition period TP, the driver is likely to take over the driving while recognizing the external environment of the vehicle 1. If the termination target velocity VE is set in the same way regardless of the external environment, there is concern that the driver has a strange feeling or an uneasy feeling. Hence, the automatic driving system 10 variably sets the termination target velocity VE at the end point PE, depending on the external environment at the end point PE or the external environment surrounding the end point PE. Then, the automatic driving system 10 executes the velocity control such that the vehicle velocity V at the end point PE is the set termination target velocity VE. This reduces the strange feeling or uneasy feeling of the driver at the time of the driving transition.

The driving transition process in which the external environment of the vehicle 1 is considered will be described below in further detail.

2. Driving Transition Process in which External Environment is Considered

Figures 4, 5:
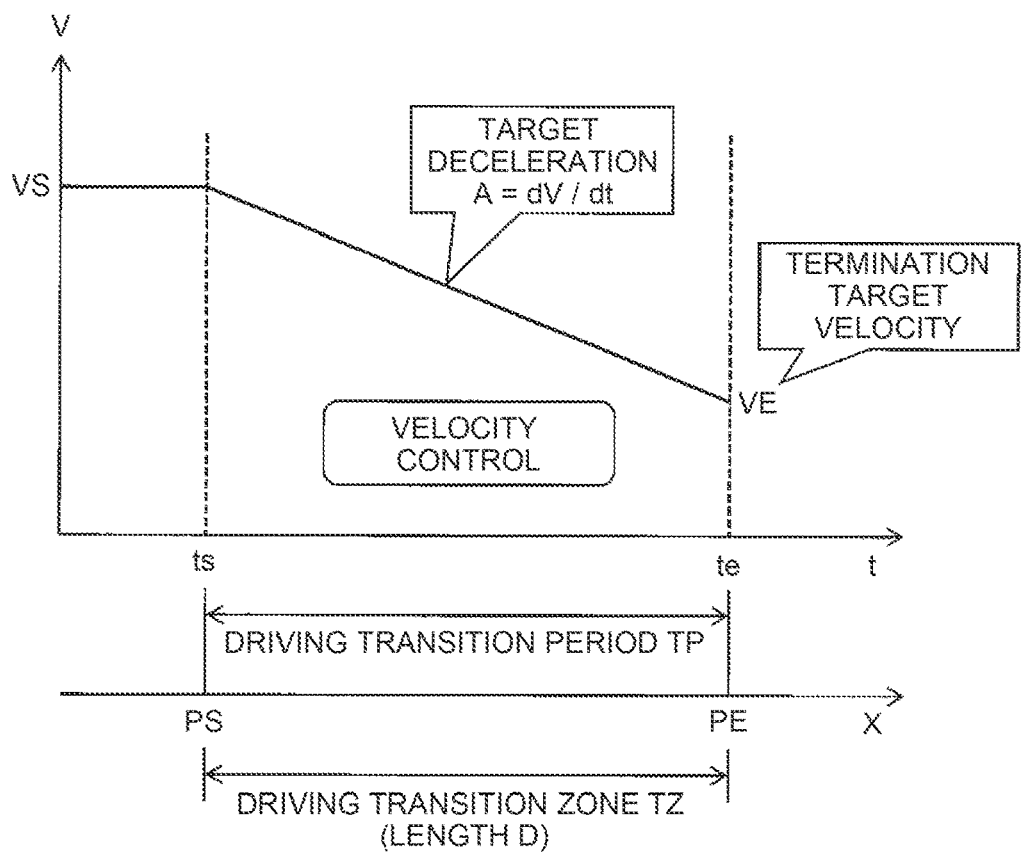
FIG. 4 is a conceptual diagram showing exemplary external environments that are considered in the driving transition process according to the embodiment of the present disclosure.
FIG. 5 is a conceptual diagram for describing an exemplary decision method for a driving transition period (driving transition zone) in the embodiment of the present disclosure.

FIG. 4 shows exemplary external environments that are considered in the driving transition process according to the embodiment.

2-1. First Standpoint

In a first standpoint, a "prescribed velocity" that is prescribed for the end point PE of the driving transition zone TZ is considered. The prescribed velocity is a velocity that is prescribed by traffic rules and the like.

For example, suppose that the end point PE is a stop position. The vehicle 1 is required to stop at the stop position. That is, the prescribed velocity for the stop position is 0 km/h. If the vehicle 1 does not stop at the end point PE, the driver has a strange feeling or an uneasy feeling. Hence, the automatic driving system 10 sets the termination target velocity VE to 0 km/h (prescribed velocity).

As another example, suppose that the speed limit at the end point PE is 40 km/h. In this case, the prescribed velocity for the end point PE is the speed limit, namely, 40 km/h. If the vehicle velocity V at the end point PE is exceeding the speed limit, the driver has a strange feeling or an uneasy feeling. Hence, the automatic driving system 10 sets the termination target velocity VE to equal to or lower than the speed limit. For example, the automatic driving system 10 sets the termination target velocity VE to 20 km/h.

Thus, the automatic driving system 10 variably sets the termination target velocity VE at the end point PE, in consideration of the prescribed velocity that is prescribed for the end point PE. Then, the automatic driving system 10 executes the velocity control such that the vehicle velocity V at the end point PE is the termination target velocity VE. This reduces the strange feeling or uneasy feeling of the driver at the time of the driving transition.

Further, in the case where the driving transition period TP is too long or too short, the driver has a strange feeling. Accordingly, the automatic driving system 10 appropriately decides the driving transition period TP (driving transition zone TZ).

FIG. 5 is a conceptual diagram for describing an exemplary decision method for the driving transition period TP. The format of FIG. 5 is the same as the format of the already-described FIG. 2. The termination target velocity VE at the end point PE is set as described above. As the start velocity VS at the start point PS, for example, the current vehicle velocity V is used. The driving transition period TP (driving transition zone TZ) that is needed for realizing the termination target velocity VE at the end point PE is specified just by deciding the a target deceleration A in the driving transition period TP.

When the target deceleration A is too high, a high load is applied to the driver or the vehicle 1, so that the driver has an uncomfortable feeling. Further, when the target deceleration A is too high, the driving transition period TP becomes short, so that the driver feels impatient or inconvenient. Accordingly, for the target deceleration A, a predetermined upper limit value (acceptable value) is provided. On the other hand, when the target deceleration A is too low, the driving transition period TP becomes long needlessly. Therefore, the automatic driving system 10 sets the target deceleration A, to an appropriate value that is equal to or lower than the predetermined upper limit value. For example, the automatic driving system 10 sets the target deceleration A to the predetermined upper limit value.

After the setting of the termination target velocity VE and the target deceleration A, the automatic driving system 10 decides the start point PS (start timing ts), such that the termination target velocity VE at the end point PE is realized by the target deceleration A. Thus, an appropriate driving transition period TP (driving transition zone TZ) is decided. This also contributes to the reduction in the strange feeling of the driver at the time of the driving transition.

As shown in FIG. 3, the driving transition zone TZ may contain a zone where the vehicle velocity V is kept constant. In this case, the automatic driving system 10 decides the start point PS, in consideration of the zone where the vehicle velocity V is kept constant.

As another example, the automatic driving system 10 may previously decide a length D of the driving transition zone TZ, and then, may decide the target deceleration A. For example, first, the length D of the driving transition zone TZ is temporarily set to a minimum value. Subsequently, a target deceleration A that allows the termination target velocity VE to be realized is calculated. In the case where the calculated target deceleration A is exceeding the above-described upper limit value, the length D of the driving transition zone TZ is increased. By repeating the processes, it is possible to decide an appropriate length D of the driving transition zone TZ and an appropriate target deceleration A.

2-2, Second Standpoint

In a second standpoint, a "road attribute" at the end point PE of the driving transition zone TZ is considered. The road attribute includes at least one of presence or absence of an intersection, presence or absence of a traffic light, presence or absence of a tollgate, and type of the tollgate.

For example, in the case where the intersection or the traffic light exists at the end point PE, the automatic driving system 10 sets the termination target velocity VE to 0 km/h. As another example, in the case where the tollgate exists at the end point PE, the automatic driving system 10 further considers the type of the tollgate. In the case where the tollgate is an automatic toll collection type tollgate such as an electronic toll collection (ETC), the automatic driving system 10 sets the termination target velocity VE to 20 km/h. In the case where the tollgate is a manual type tollgate or a manned type tollgate, the automatic driving system 10 sets the termination target velocity VE to 0 km/h.

Further, in another example, whether the end point PE is on a main line of an expressway or a toll road is considered as the road attribute. Generally, a traffic flow on the main line is faster than a traffic flow on a branch lane that branches from the main line. Accordingly, the automatic driving system 10 sets the termination target velocity VE when the end point PE is on the main line, to a higher velocity than the termination target velocity VE when the end point PE is on the branch lane.

Figure 6:
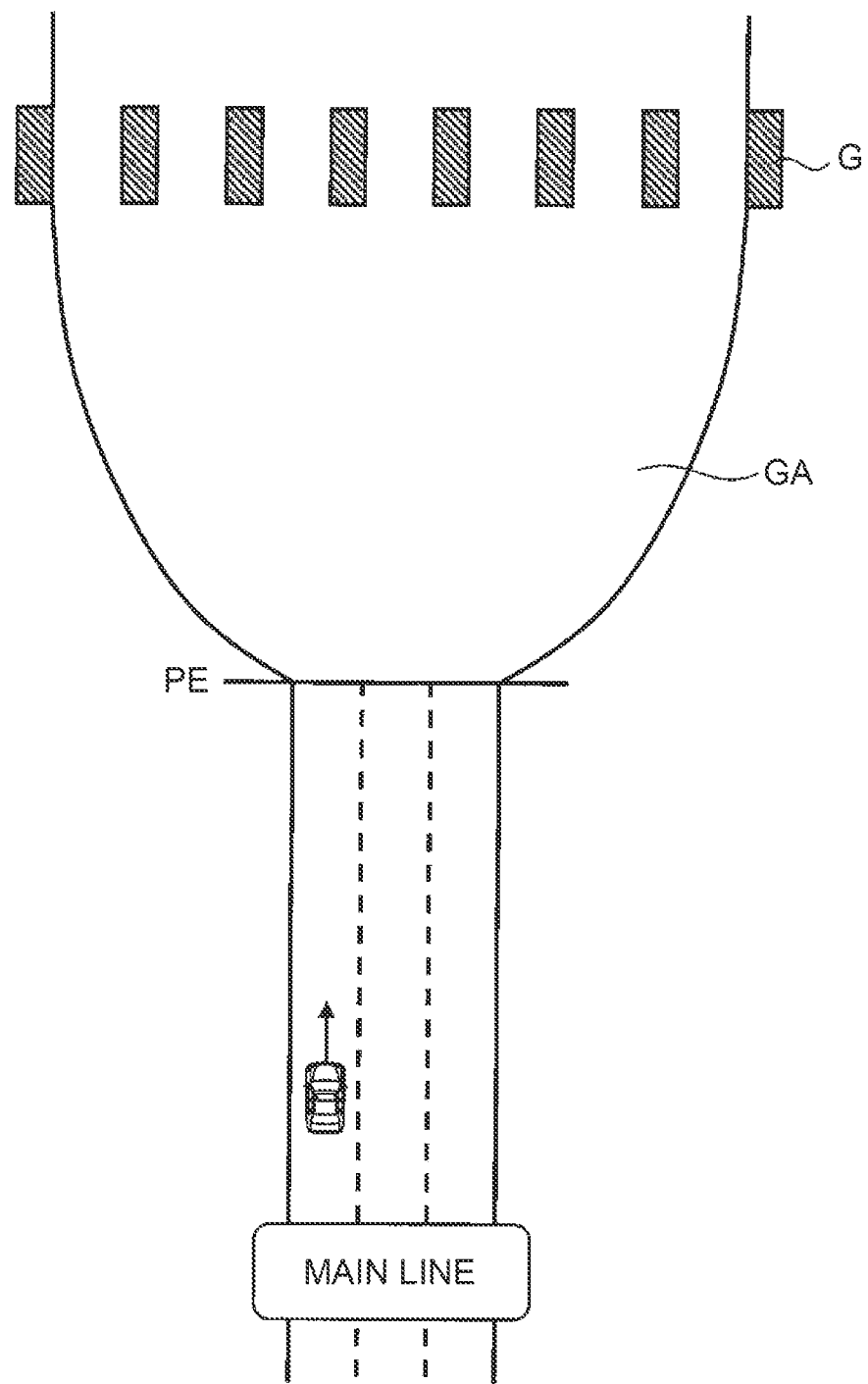
FIG. 6 is a conceptual diagram showing an exemplary case where an end point of the driving transition zone is on a main line.

FIG. 6 shows an exemplary case where the end point PE is on the main line. In the example shown in FIG. 6, a tollgate G (main line tollgate) is installed on the main line. In front of the tollgate G, a wide tollgate area GA exists. In the tollgate area GA, white lines are broken off, and therefore, the automatic driving can become difficult. Therefore, the end point PE is in front of the tollgate area GA. That is, the end point PE is at a near-side position away from the tollgate G. Accordingly, if the termination target velocity VE is set to a low velocity (20 km/h or 0 km/h) for the tollgate, the driver has a strange feeling. Further, the traffic flow on the main line is interrupted, and there is concern that congestion occurs. Hence, the automatic driving system 10 sets the termination target velocity VE in the case of FIG. 6, to a higher velocity than the low velocity for the tollgate.

Figure 7:
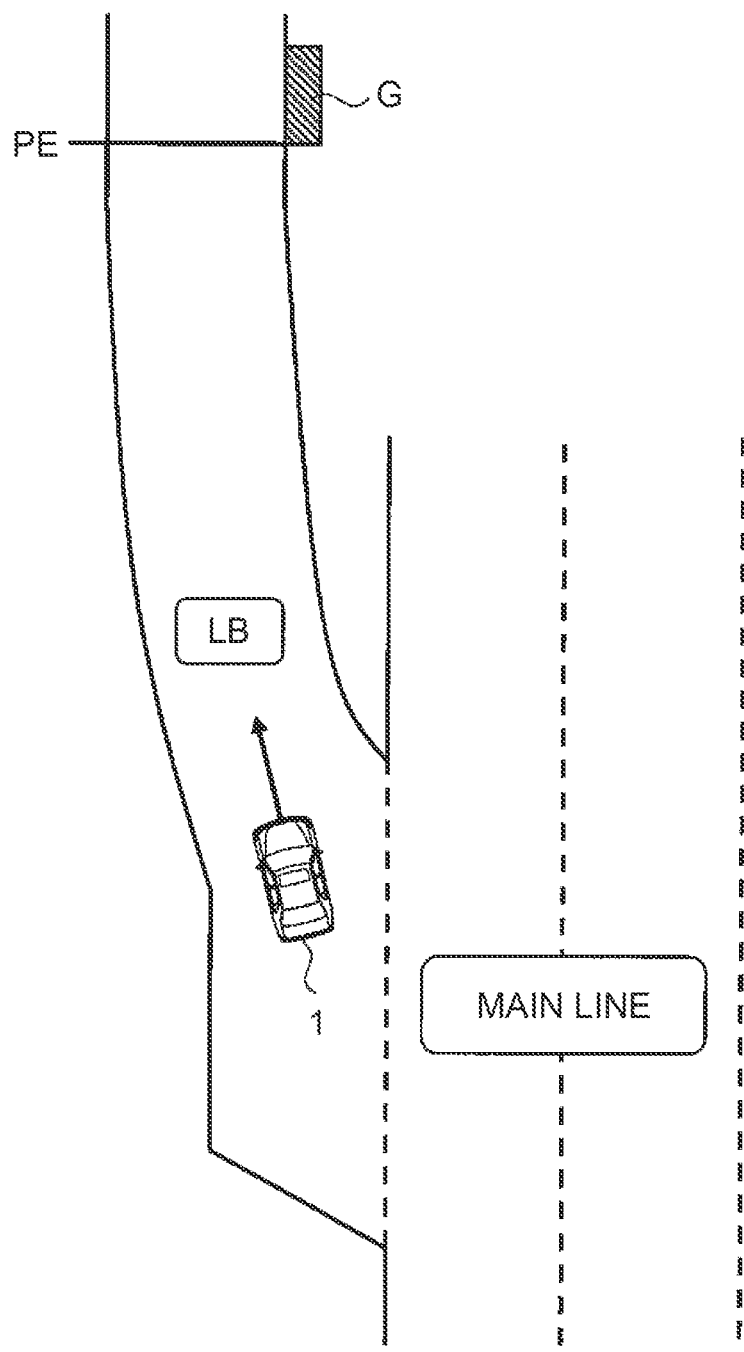
FIG. 7 is a conceptual diagram showing an exemplary case where the end point of the driving transition zone is on a branch lane.

In an example shown in FIG. 7, a branch lane LB branches from the main line, and the end point PE is on the branch lane LB. The automatic driving system 10 sets the termination target velocity VE to a lower velocity than that in the case of the main line. For example, the tollgate G is installed at the end point PE on the branch lane LB. In this case, the automatic driving system 10 sets the termination target velocity VE to the low velocity for the tollgate.

Thus, the automatic driving system 10 variably sets the termination target velocity VE at the end point PE, in consideration of the road attribute at the end point PE. Thereafter, the automatic driving system 10 decides the start point PS, by the same technique as that in the case of the above-described first standpoint. Then, the automatic driving system 10 executes the velocity control such that the vehicle velocity V at the end point PE is the termination target velocity VE. This reduces the strange feeling or uneasy feeling of the driver at the time of the driving transition.

2-3. Third Standpoint

Figure 8:
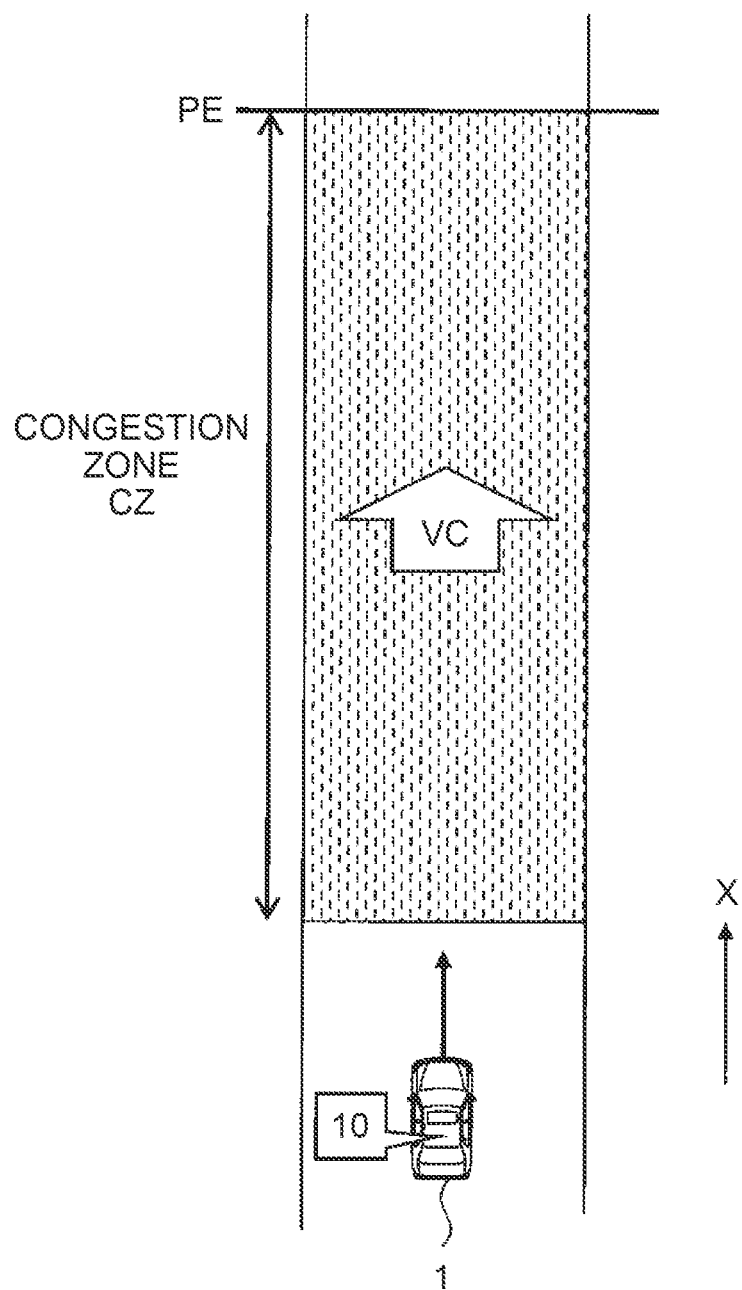
FIG. 8 is a conceptual diagram showing a case where a congestion zone exists in front of the end point of the driving transition zone.

FIG. 8 shows a case where a congestion zone CZ exists in front of the end point PE of the driving transition zone TZ. The velocity of a traffic flow in the congestion zone CZ is very low. Accordingly, it takes a long time for the vehicle 1 to go through the congestion zone CZ. If the start point PS is decided by the same technique as that in the case of the above-described first standpoint with no consideration for the congestion zone CZ, there is concern that the driving transition period TP becomes long needlessly. In other words, even though it takes a long time for the vehicle 1 to arrive at the end point PE, the transition demand TD is issued early needlessly. This causes a strange feeling of the driver. Further, after the driver takes over the driving at an early timing, the driver needs to manually drive in the rest of the congestion zone CZ. This causes the stress of the driver.

Hence, in the third standpoint, the automatic driving system 10 considers whether the congestion zone CZ exists in front of the end point PE. In the case where the congestion zone CZ exists in front of the end point PE, the automatic driving system 10 decides the termination target velocity VE and the start point PS by the following technique.

Figure 9:
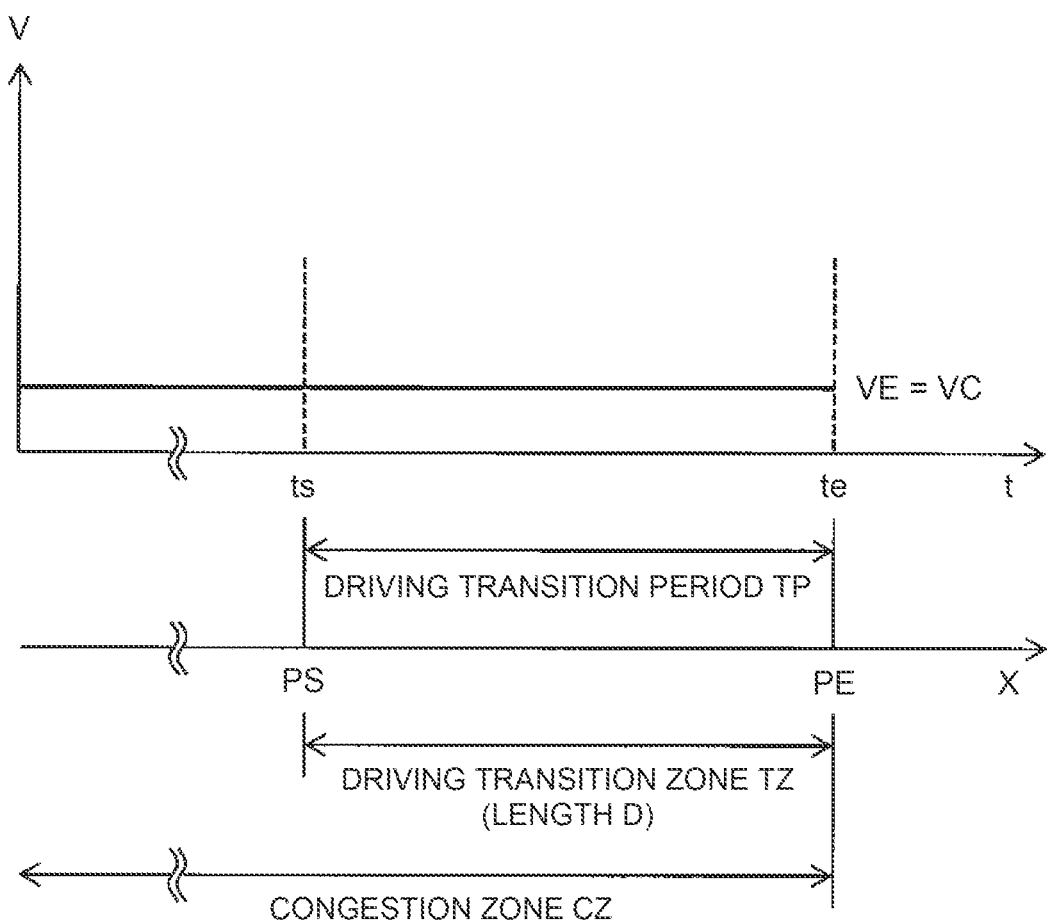
FIG. 9 is a conceptual diagram for describing an exemplary decision method for the driving transition period (driving transition zone) in the case shown in FIG. 8.

FIG. 9 is a conceptual diagram for describing a technique in the third standpoint. The format of FIG. 9 is the same as the format of the above-described FIG. 2. First, the automatic driving system 10 assumes that the velocity of the traffic flow in the congestion zone CZ is a constant velocity VC. That is, the automatic driving system 10 assumes that the vehicle 1 passes through the congestion zone CZ at the constant velocity VC. For example, the constant velocity VC is previously decided. Alternatively, in the case where the vehicle 1 already exists in the congestion zone CZ, the average value of the vehicle velocity V may be used as the constant velocity VC.

The automatic driving system 10 sets the termination target velocity VE at the end point PE, to the above constant velocity VC. Then, the automatic driving system 10 decides the start point PS, such that the vehicle 1 passes through the driving transition zone TZ at the constant velocity VC in a constant time. The constant time corresponds to the driving transition period TP, and is set to an appropriate time that allows the driver not to have a strange feeling.

Thus, the automatic driving system 10 variably sets the termination target velocity VE and the start position PS, in consideration of whether the congestion zone CZ exists in front of the end point PE. In the case where the congestion zone CZ exist in front of the end point PE, the automatic driving system 10 decides the start point PS such that the driving transition period TP does not become long needlessly. This reduces the strange feeling and stress of the driver at the time of the driving transition.

2-4. Fourth Standpoint

In a fourth standpoint, "weather" surrounding the end point PE of the driving transition zone TZ is considered. In the following description, "bad weather" means a weather condition that gives a bad influence on vehicle traveling and that includes rain, snow, thunder, strong wind and freeze. In the case of the bad weather, the driver hopes to take over the driving in a safer vehicle traveling state.

Hence, the automatic driving system 10 variably sets the termination target velocity VE at the end point PE, depending on the weather surrounding the end point PE. Specifically, the automatic driving system 10 sets the termination target velocity VE in the case of the bad weather, to a lower velocity than the termination target velocity VE in the case of good weather. This reduces the strange feeling or uneasy feeling of the driver at the time of the driving transition.

Further, the automatic driving system 10 may variably set the target deceleration A in the driving transition zone TZ, depending on the weather surrounding the end point PE. Specifically, the automatic driving system 10 sets the target deceleration A in the case of the bad weather, to a lower deceleration than the target deceleration A in the case of the good weather. This further reduces the strange feeling or uneasy feeling of the driver at the time of the driving transition. Further, behavior of the vehicle during the velocity control becomes more stable.

2-5. Fifth Standpoint

In a fifth standpoint, "illuminance-darkness" surrounding the end point PE of the driving transition zone TZ is considered. A state where the illuminance is low is equivalent to a state where the darkness is high. In the case where the surrounding of the end point PE is dark, the driver hopes to take over the driving in a safer vehicle traveling state.

Hence, the automatic driving system 10 variably sets the termination target velocity VE at the end point PE, depending on the illuminance-darkness surrounding the end point PE. Specifically, the automatic driving system 10 sets the termination target velocity VE in the case of a low illuminance, to a lower velocity than the termination target velocity VE in the case of a high illuminance. This reduces the strange feeling or uneasy feeling of the driver at the time of the driving transition.

Further, the automatic driving system 10 may variably set the target deceleration A in the driving transition zone TZ, depending on the illuminance-darkness surrounding the end point PE. Specifically, the automatic driving system 10 sets the target deceleration A in the case of a low illuminance, to a lower deceleration than the target deceleration A in the case of a high illuminance. This further reduces the strange feeling or uneasy feeling of the driver at the time of the driving transition.

2-6. Sixth Standpoint

Some of the above-described first to fifth standpoints may be combined. For example, the first standpoint is combined with the fourth or fifth standpoint. Specifically, first, the termination target velocity VE and the target deceleration A are decided by the technique described in the first standpoint (see FIG. 5). Thereafter, the target deceleration A is adjusted in accordance with the fourth or fifth standpoint. That is, the automatic driving system 10 variably sets the target deceleration A, depending on the weather or illuminance-darkness surrounding the end point PE. Similarly, the second standpoint may be combined with the fourth or fifth standpoint.

Priorities may be decided for the above-described first to fifth standpoints. For example, "probability" of information indicating the external environment considered in each of the above-described first to fifth standpoints is used as the priority. The automatic driving system 10 executes the driving transition process, in consideration of the external environment with the highest priority.

3. Exemplary Configuration of Automatic Driving System 3-1. Whole Configuration

Figure 10:
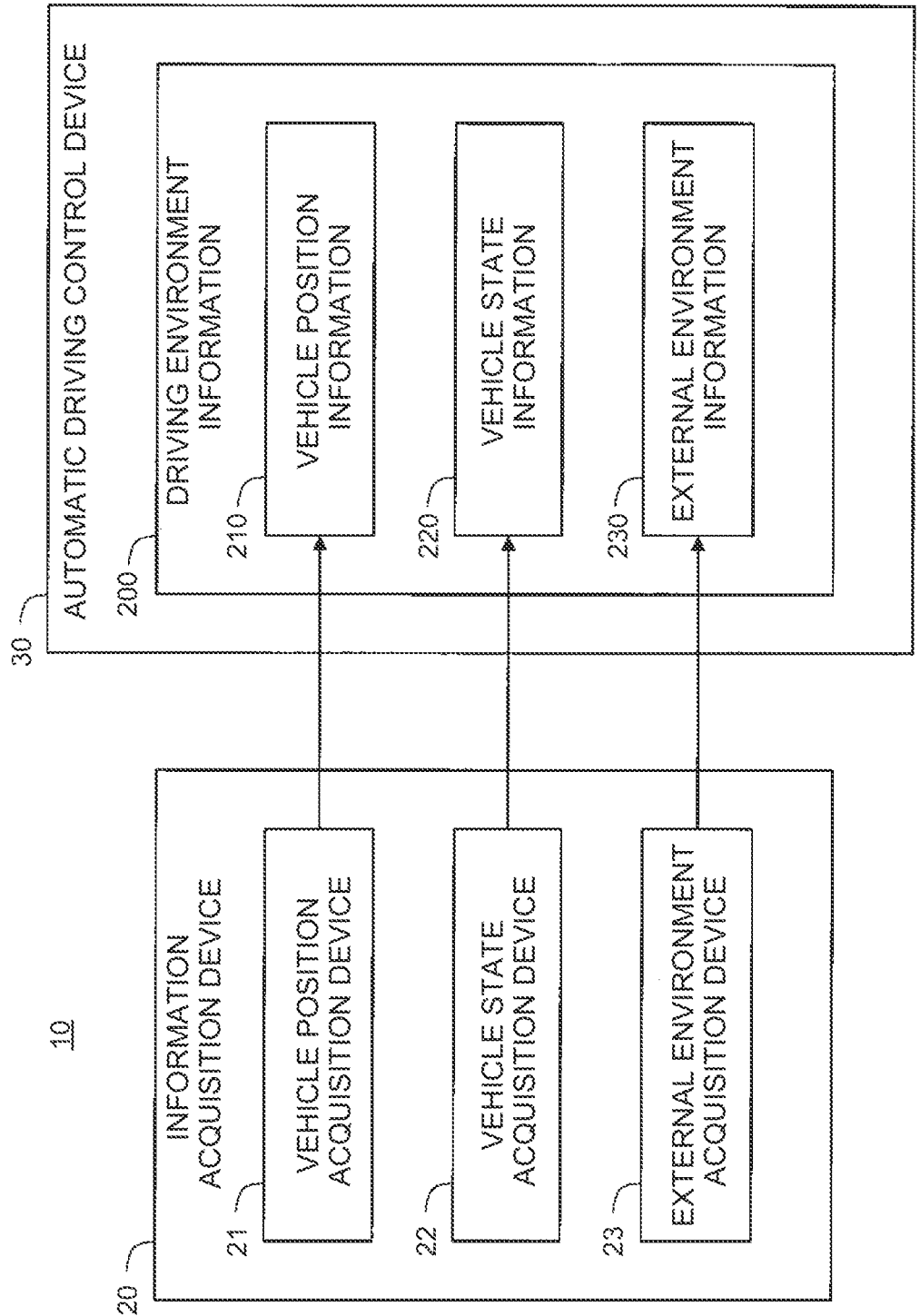
FIG. 10 is a block diagram schematically showing a configuration of the automatic driving system according to the embodiment of the present disclosure.

FIG. 10 is a block diagram schematically showing a configuration of the automatic driving system 10 according to the embodiment. The automatic driving system 10 includes an information acquisition device 20 and an automatic driving control device 30.

The information acquisition device 20 acquires driving environment information 200 indicating a driving environment of the vehicle 1. For example, the information acquisition device 20 includes a vehicle position acquisition device 21, a vehicle state acquisition device 22 and an external environment acquisition device 23. The vehicle position acquisition device 21 acquires vehicle position information 210 indicating the position of the vehicle 1. The vehicle state acquisition device 22 acquires vehicle state information 220 indicating the state (for example, the vehicle velocity V) of the vehicle 1. The external environment acquisition device 23 acquires external environment information 230 indicating the external environment of the vehicle 1. The driving environment information 200 includes the vehicle position information 210, the vehicle state information 220 and the external environment information 230.

The automatic driving control device 30 receives the driving environment information 200 from the information acquisition device 20. Then, the automatic driving control device 30 controls the automatic driving of the vehicle 1, based on the driving environment information 200. Further, the automatic driving control device 30 executes the driving transition process, based on the driving environment information 200.

Figure 11:
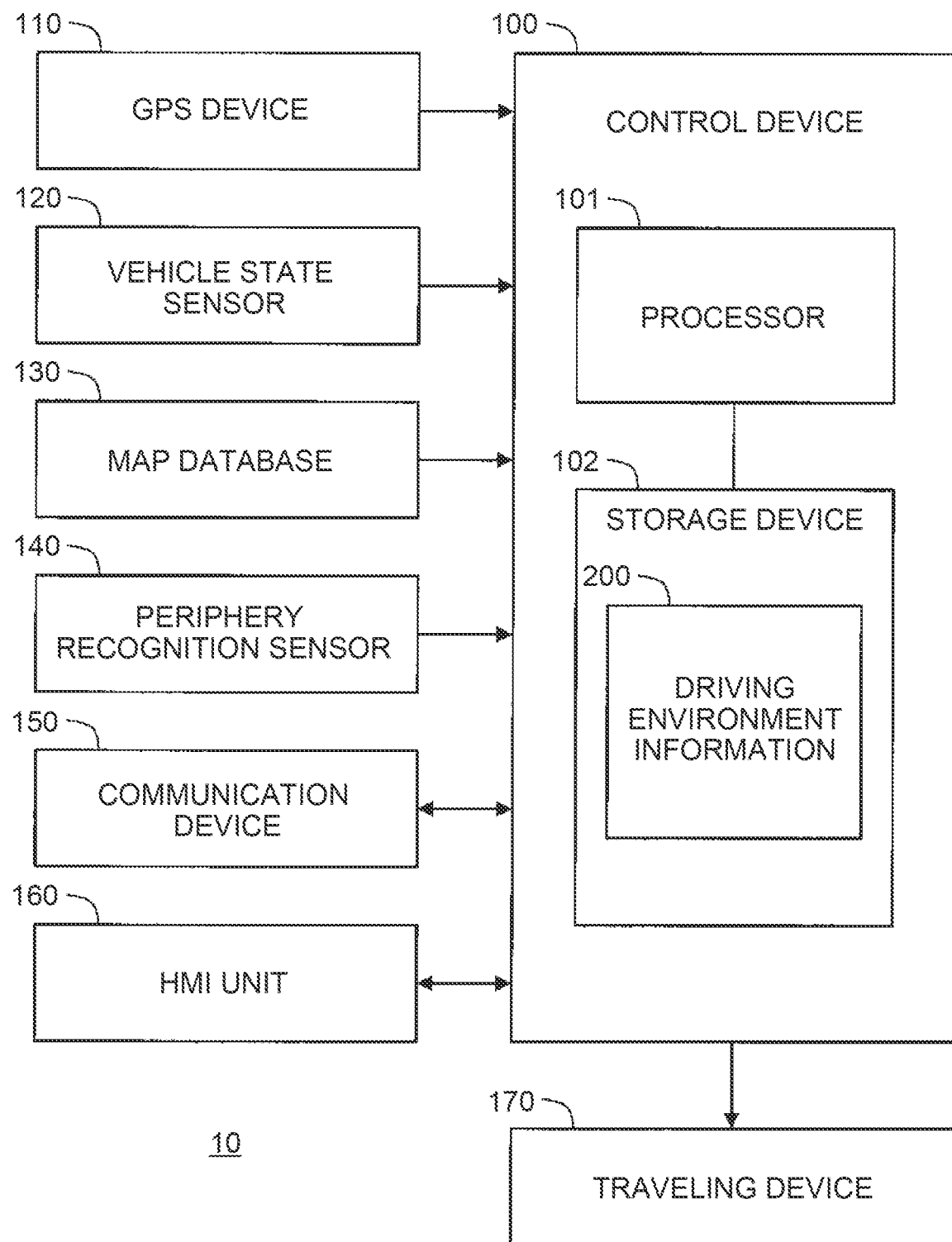
FIG. 11 is a block diagram showing an exemplary specific configuration of the automatic driving system according to the embodiment of the present disclosure.

FIG. 11 is a block diagram showing an exemplary specific configuration of the automatic driving system 10 according to the embodiment. The automatic driving system 10 includes a control device 100, a global positioning system (GPS) device 110, a vehicle state sensor 120, a map database 130, a periphery recognition sensor 140, a communication device 150, a HMI unit 160, and a traveling device 170.

The control device 100 controls the automatic driving of the vehicle 1. The control device 100 is a microcomputer including a processor 101 and a storage device 102. The control device 100 is also referred to as an electronic control unit (ECU). The processor 101 executes control programs contained in the storage device 102, so that various processes are realized by the control device 100.

The GPS device 110 receives signals that are sent from a plurality of GPS satellites, and calculates the position and orientation of the vehicle 1, based on the received signals.

The vehicle state sensor 120 detects the state of the vehicle 1. The state of the vehicle 1 includes the velocity (vehicle velocity V), wheel speed, acceleration, steering angle, yaw rate of the vehicle 1, and the like. Further, the state of the vehicle 1 also includes a driving operation by the driver. The driving operation includes an accelerator operation, a brake operation and a steering operation. Furthermore, the state of the vehicle 1 may include an operating state of a wiper, a lighting state of a head light, and the like.

In the map database 130, map information is recorded. The map information includes a general road map and a navigation map. Further, the map information includes information about lane arrangement, the road attribute, the stop position, the speed limit, the automatic driving permission zone, and the like.

The periphery recognition sensor 140 detects the situation of the periphery of the vehicle 1. Examples of the periphery recognition sensor 140 include a camera, a LIDAR (Laser Imaging Detection and Ranging), and a radar. Furthermore, the periphery recognition sensor 140 may include a rain sensor, an illuminance sensor and the like.

The communication device 150 communicates with the exterior of the vehicle 1. For example, the communication device 150 communicates with an external device in the exterior of the vehicle 1, through a communication network. The communication device 150 may perform a V2I communication (road-vehicle communication) with an infrastructure in the periphery. The communication device 150 may perform a V2V communication (inter-vehicle communication) with a surrounding vehicle.

The HMI unit 160 is an interface for providing information to a driver and accepting information from the driver. Specifically, the HMI unit 160 includes an input device and an output device. Examples of the input device include a touch panel, a switch and a microphone. Examples of the output device include a display device and a speaker.

The traveling device 170 includes a steering device, a driving device and a braking device. The steering device steers wheels. The driving device is a power source that generates driving power. Examples of the driving device include an electric motor and an engine. The braking device generates braking power.

3-2. Information Acquisition Device 20

The control device 100 acquires the driving environment information 200. The driving environment information 200, which is contained in the storage device 102, is read and used when appropriate.

3-2-1. Vehicle Position Acquisition Device 21

The control device 100 acquires the vehicle position information 210 indicating the position and orientation of the vehicle 1, from the GPS device 110. It can be said that the control device 100 and the GPS device 110 constitute the vehicle position acquisition device 21 shown in FIG. 10.

3-2-2. Vehicle State Acquisition Device 22

The control device 100 acquires the vehicle state information 220 indicating the state of the vehicle 1, from the vehicle state sensor 120. The state of the vehicle 1 includes the velocity (vehicle velocity V), wheel speed, acceleration, steering angle, yaw rate and the like of the vehicle 1. Further, the state of the vehicle 1 also includes the driving operation by the driver of the vehicle 1. Furthermore, the state of the vehicle 1 includes the operating state of the wiper, the lighting state of the head light, and the like. It can be said that the control device 100 and the vehicle state sensor 120 constitute the vehicle state acquisition device 22 shown in FIG. 10.

3-2-3. External Environment Acquisition Device 23

The control device 100 acquires the map information from the map database 130. The map database 130 may be contained in an external device in the exterior of the vehicle 1. In this case, the control device 100 communicates with the external device through the communication device 150, and acquires the map information from the exterior device.

Further, the control device 100 acquires surrounding situation information indicating the situation of the periphery of the vehicle 1. The surrounding situation information is information that is obtained from a detection result by the periphery recognition sensor 140. For example, the surrounding situation information includes camera pickup information that is obtained by the camera. Further, the surrounding situation information includes measurement information that is obtained by the LIDAR or the radar. Further, the surrounding situation information includes physical object information relevant to a physical object in the periphery of the vehicle 1. Examples of the physical object in the periphery of the vehicle 1 include a surrounding vehicle, a white line, a sign, a road marking, a traffic light and a roadside body. Further, the surrounding situation information includes information that is detected by the rain sensor. Further, the surrounding situation information includes the illuminance that is detected by the illuminance sensor.

The rainfall state in the periphery of the vehicle 1 can be estimated also from the operating state of the wiper. Further, the illuminance in the periphery of the vehicle 1 can be estimated also from the lighting state of the head light. That is, the control device 100 can acquire the surrounding situation information also using the vehicle state sensor 120.

Furthermore, the control device 100 acquires delivery information by performing the communication with the exterior using the communication device 150.

Examples of the delivery information include road traffic information and weather information that are delivered from infrastructures. The delivery information may include information (the vehicle velocity and the like) about the surrounding vehicle that is obtained through the V2V communication.

The external environment information 230 includes the above-described map information, surrounding situation information and delivery information. It can be said that the control device 100, the vehicle state sensor 120, the map database 130, the periphery recognition sensor 140 and the communication device 150 constitute the external environment acquisition device 23 shown in FIG. 10.

3-3. Automatic Driving Control Device 30

The control device 100 controls the automatic driving of the vehicle 1, based on the driving environment information 200. Specifically, the control device 100 generates a traveling plan for the vehicle 1, based on the driving environment information 200. The traveling plan includes a target route to a destination and a local target track. Then, the control device 100 causes the vehicle 1 to travel in accordance with the traveling plan. For the traveling of the vehicle 1, the control device 100 actuates the traveling device 170 (the steering device, the driving device and the braking device) when appropriate, and thereby, performs a steering control, an acceleration control and a deceleration control.

Further, the control device 100 executes the driving transition process based on the driving environment information 200. Specifically, the control device 100 decides the termination target velocity VE and the start point PS, based on the driving environment information 200 (particularly, the external environment information 230). Further, the control device 100 issues the transition demand TD to the driver through the HMI unit 160. Furthermore, the control device 100 actuates the traveling device 170 when appropriate, and thereby, performs the velocity control.

It can be said that the control device 100, the HMI unit 160 and the traveling device 170 constitute the automatic driving control device 30 shown in FIG. 10. The driving transition process by the automatic driving control device 30 (control device 100) will be described below in further detail.

4. Driving Transition Process

Figure 12:
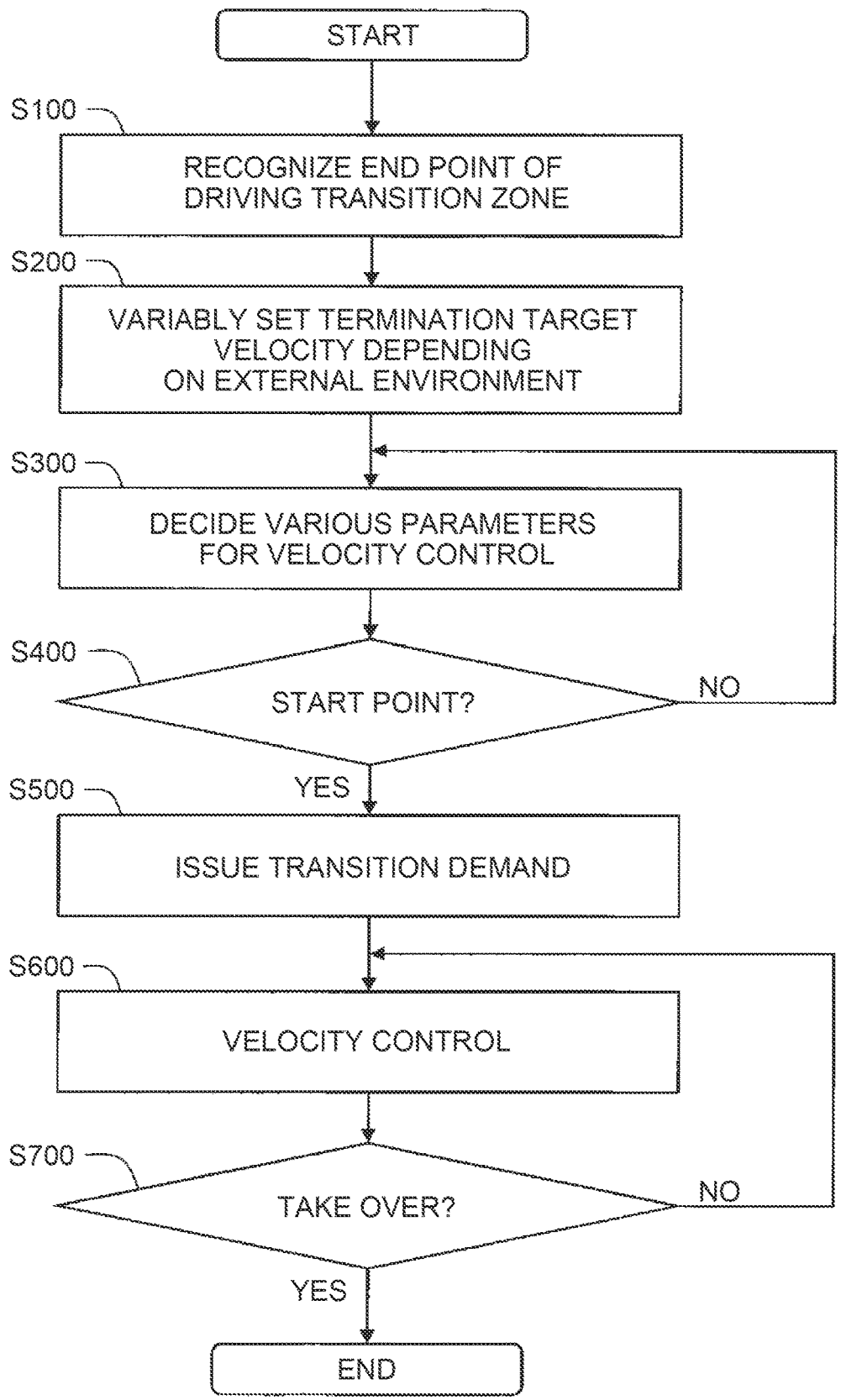
FIG. 12 is a flowchart showing the driving transition process according to the embodiment of the present disclosure.

FIG. 12 is a flowchart showing the driving transition process by the automatic driving control device 30 (control device 100) according to the embodiment.

4-1. Step S100

The automatic driving control device 30 recognizes the end point PE of the driving transition zone TZ, based on the map information. For example, the map information includes information about the automatic driving permission zone. The automatic driving control device 30 recognizes an end point of the automatic driving permission zone or a point in front of the end point, as the end point PE of the driving transition zone TZ.

4-2. Step S200

The automatic driving control device 30 variably sets the termination target velocity VE at the end point PE, depending on the external environment at the end point PE or the external environment surrounding the end point PE. As described above, there are various examples as the external environment (see FIG. 4).

4-2-1. First Standpoint

In the first standpoint, the prescribed velocity that is prescribed for the end point PE of the driving transition zone TZ is considered. The external environment information 230 includes information indicating the prescribed velocity.

For example, the map information includes information about the stop position. Accordingly, the automatic driving control device 30 can recognize the stop position, based on the map information. Further, the physical object information includes information about a sing or road marking indicating the stop. Accordingly, the automatic driving control device 30 can recognize the stop position based on the physical object information. In the case where the end point PE is the stop position, the prescribed velocity is 0 km/h.

As another example, the map information includes information about the speed limit. Accordingly, the automatic driving control device 30 can recognize the speed limit, based on the map information. Further, the physical object information includes information about a sign indicating the speed limit. Accordingly, the automatic driving control device 30 can recognize the speed limit based on the physical object information. The prescribed velocity is the speed limit at the end point PE.

Thus, the automatic driving control device 30 recognizes the prescribed velocity that is prescribed for the end point PE, based on the external environment information 230. Then, the automatic driving control device 30 sets the termination target velocity VE to equal to or lower than the prescribed velocity.

4-2-2. Second Standpoint

In the second standpoint, the road attribute at the end point PE of the driving transition zone TZ is considered. The external environment information 230 includes information indicating the road attribute.

For example, the map information includes information about the lane arrangement (the main line and the branch lane), the position of the intersection, the position of the traffic light, the position of the tollgate and the type of the tollgate. Accordingly, the automatic driving control device 30 can recognize the road attribute based on the map information. As another example, the physical object information includes information about a sign indicating the road attribute. Accordingly, the automatic driving control device 30 can recognize the road attribute based on the physical object information.

Thus, the automatic driving control device 30 recognizes the road attribute at the end point PE, based on the external environment information 230. Then, the automatic driving control device 30 variably sets the termination target velocity VE depending on the road attribute.

For example, in the case where the intersection or the traffic light exists at the end point PE, the termination target velocity VE is set to 0 km/h. In the case where the automatic toll collection type tollgate exists at the end point PE, the termination target velocity VE is set to 20 km/h. In the case where the manual type tollgate or manned type tollgate exists at the end point PE, the termination target velocity VE is set to 0 km/h. The termination target velocity VE when the end point PE is on the main line is set to a higher velocity than the termination target velocity VE when the end point PE is on the branch lane LB (see FIG. 6 and FIG. 7).

4-2-3. Third Standpoint

In the third standpoint, whether the congestion zone CZ exists in front of the end point PE of the driving transition zone TZ is considered (see FIG. 8). The external environment information 230 includes information indicating the congestion zone CZ.

For example, the delivery information includes road traffic information indicating the congestion zone CZ. The automatic driving control device 30 can determine whether the congestion zone CZ exists in front of the end point PE, based on the delivery information.

In the case where the congestion zone CZ exists in front of the end point PE, the automatic driving control device 30 assumes that the vehicle 1 passes through the congestion zone CZ at the constant velocity VC. For example, the constant velocity VC is previously decided. As another example, in the case where the vehicle 1 already exists in the congestion zone CZ, the average value of the vehicle velocity V may be used as the constant velocity VC. Furthermore, as another example, the constant velocity VC may be estimated based on the road traffic information.

Thus, the automatic driving control device 30 acquires the constant velocity VC in the congestion zone CZ. Then, the automatic driving control device 30 sets the termination target velocity VE at the end point PE, to the constant velocity VC (see FIG. 9).

4-2-4. Fourth Standpoint

In the fourth standpoint, the weather surrounding the end point PE of the driving transition zone TZ is considered. The external environment information 230 includes information indicating the weather.

For example, the delivery information includes the weather information. Accordingly, the automatic driving control device 30 can recognize the weather based on the delivery information. As another example, the surrounding situation information includes the information that is detected by the rain sensor. Furthermore, as another example, the surrounding situation information includes the rainfall state that is estimated from the operating state of the wiper. Accordingly, the automatic driving control device 30 can recognize the weather based on the surrounding situation information.

Thus, the automatic driving control device 30 recognizes the weather surrounding the end point PE, based on the external environment information 230. Then, the automatic driving control device 30 variably sets the termination target velocity VE, depending on the weather surrounding the end point PE. Specifically, the automatic driving control device 30 sets the termination target velocity VE in the case of the bad weather, to a lower velocity than the termination target velocity VE in the case of the good weather.

4-2-5. Fifth Standpoint

In the fifth standpoint, the illuminance-darkness surrounding the end point PE of the driving transition zone TZ is considered. The external environment information 230 includes information indicating the illuminance-darkness.

For example, the surrounding situation information includes the camera pickup information that is obtained by the camera. As another example, the surrounding situation information includes the illuminance that is detected by the illuminance sensor. Furthermore, as another example, the surrounding situation information includes the illuminance-darkness that is estimated from the lighting state of the head light. Accordingly, the automatic driving control device 30 can recognize the illuminance-darkness based on the surrounding situation information.

Thus, the automatic driving control device 30 recognizes the illuminance-darkness surrounding the end point PE, based on the external environment information 230. Then, the automatic driving control device 30 variably sets the termination target velocity VE at the end point PE, depending on the illuminance-darkness surrounding the end point PE. Specifically, the automatic driving control device 30 sets the termination target velocity VE in the case of a low illuminance, to a lower velocity than the termination target velocity VE in the case of a high illuminance.

4-3. Step S300

Subsequently, the automatic driving control device 30 decides various parameters for the velocity control. The various parameters for the velocity control include the start point PS, the start velocity at the start point PS, and the target deceleration A. As the start velocity VS at the start point PS, for example, the current vehicle velocity V of the vehicle 1 is used.

For the target deceleration A, as described above, the predetermined upper limit value (acceptable value) is provided. The automatic driving control device 30 sets the target deceleration A, to an appropriate value that is equal to or lower than the predetermined upper limit value. For example, the automatic driving control device 30 sets the target deceleration A to the predetermined upper limit value.

Furthermore, the automatic driving control device 30 may adjust the target deceleration A, depending on the weather surrounding the end point PE. Specifically, the automatic driving control device 30 sets the target deceleration A in the case of the bad weather, to a lower deceleration than the target deceleration A in the case of the good weather. Alternatively, the automatic driving control device 30 may adjust the target deceleration A, depending on the illuminance-darkness surrounding the end point PE. Specifically, the automatic driving control device 30 sets the target deceleration A in the case of a low illuminance, to a lower deceleration than the target deceleration A in the case of a high illuminance.

When the start velocity VS, the termination target velocity VE and the target deceleration A are decided, the start point PS that is needed for realizing the termination target velocity VE at the end point PE is specified. That is, the automatic driving control device 30 decides the start point PS, based on the end point PE, the start velocity VS, the termination target velocity VE and the target deceleration A.

Alternatively, the automatic driving control device 30 may previously decide the length D of the driving transition zone TZ, and then, may decide the target deceleration A. For example, first, the automatic driving control device 30 temporarily sets the length D of the driving transition zone TZ to the minimum value. Subsequently, the automatic driving control device 30 calculates the target deceleration A that allows the termination target velocity VE to be realized. In the case where the calculated target deceleration A is exceeding the above-described upper limit value, the automatic driving control device 30 increases the length D of the driving transition zone TZ. By repeating the processes, the automatic driving control device 30 can decide an appropriate length D of the driving transition zone TZ and an appropriate target deceleration A.

In the case where the congestion zone CZ exists as previously described in the third standpoint, the following processes are performed. The automatic driving control device 30 assumes that the vehicle 1 passes through the congestion zone CZ at the constant velocity VC. The constant velocity VC has been acquired in the above-described step S200. The automatic driving control device 30 decides the start point PS, such that the vehicle 1 passes through the driving transition zone TZ at the constant velocity VC in a constant time. The constant time corresponds to the driving transition period TP, and is set to an appropriate time that allows the driver not to have a strange feeling.

4-4. Step S400

The automatic driving control device 30 determines whether the vehicle 1 has reached the start point PS of the driving transition zone TZ, with reference to the vehicle position information 210. In the case where the vehicle 1 has not yet reached the start point PS (step S400; No), the process returns to step S300. On the other hand, in the case where the vehicle 1 has reached the start point PS (step S400; Yes), the process proceeds to step S500.

4-5. Step S500

The automatic driving control device 30 issues the transition demand TD to the driver through the HMI unit 160. Thereafter, the process proceeds to step S600.

4-6. Step S600

The automatic driving control device 30 performs the velocity control. Specifically, the automatic driving control device 30 controls the vehicle velocity V in the driving transition zone TZ, such that the vehicle velocity V at the end point PE is the termination target velocity VE. The current value of the vehicle velocity V is obtained from the vehicle state information 220. The automatic driving control device 30 actuates the traveling device 170 (the driving device and the braking device) when appropriate, and thereby, performs the velocity control. In the case where the vehicle control is the deceleration control, the automatic driving control device 30 performs the deceleration control with the target deceleration A decided in step S300.

4-7. Step S700

The automatic driving control device 30 determines whether the driver has taken over the driving, based on the vehicle state information 220 (the driving operation by the driver). In the case where the driver has not yet taken over the driving (step S700; No), the process returns to step S600. On the other hand, in the case where the driver has taken over the driving (step S700; Yes), the driving transition process is completed.

What is claimed is:

1. An automatic driving system comprising
   a control device that controls automatic driving of a vehicle;
   a storage device that contains external environment information indicating an external environment of the vehicle;
   a driving transition zone is a zone in which a driver of the vehicle takes over at least a part of driving of the vehicle, from the control device;
   a termination target velocity is a target velocity of the vehicle at an end point of the driving transition zone, wherein
   the control device variably sets the termination target velocity, depending on the external environment at the end point or the external environment surrounding the end point, and controls a velocity of the vehicle in the driving transition zone, such that the velocity of the vehicle at the end point is the termination target velocity,
   the external environment information includes information indicating a prescribed velocity that is prescribed for the end point and
   the control device sets the termination target velocity to equal to or lower than the prescribed velocity.

2. The automatic driving system according to claim 1, wherein:
   the external environment information includes information indicating a road attribute at the end point; and
   the control device variably sets the termination target velocity, depending on the road attribute.

3. The automatic driving system according to claim 2, wherein the road attribute includes at least one of presence or absence of an intersection, presence or absence of a traffic light, presence or absence of a tollgate, and type of the tollgate.

4. The automatic driving system according to claim 2, wherein the control device sets the termination target velocity when the end point is on a main line, to a higher velocity than the termination target velocity when the end point is on a branch lane that branches from the main line.

5. The automatic driving system according to claim 1, wherein:
   the external environment information includes information indicating weather or illuminance surrounding the end point; and
   the control device variably sets the termination target velocity, depending on the weather or the illuminance.

6. The automatic driving system according to claim 1, wherein the control device sets a target deceleration in the driving transition zone, and then, decides a start point of the driving transition zone, such that the termination target velocity at the end point is realized by the target deceleration.

7. The automatic driving system according to claim 6, wherein:
   the external environment information includes information indicating weather or illuminance surrounding the end point; and
   the control device variably sets the target deceleration, depending on the weather or the illuminance.

8. The automatic driving system according to claim 1, wherein:
   the external environment information includes information indicating a congestion zone; and
   when the congestion zone exists in front of the end point, the control device assumes that the vehicle passes through the congestion zone at a constant velocity, and sets the termination target velocity to the constant velocity.

9. The automatic driving system according to claim 8, wherein the control device decides a start point of the driving transition zone, such that the vehicle passes through the driving transition zone at the constant velocity in a constant time.

* * * * *